United States Patent
Fablet

(10) Patent No.: US 7,765,472 B2
(45) Date of Patent: Jul. 27, 2010

(54) METHOD AND DEVICE FOR EDITING SVG TYPE DIGITAL GRAPHICAL DOCUMENTS IN PARTICULAR FROM A BROWSER

(75) Inventor: Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 1222 days.

(21) Appl. No.: 10/565,501

(22) PCT Filed: Sep. 28, 2004

(86) PCT No.: PCT/IB2004/003549

§ 371 (c)(1),
(2), (4) Date: Jan. 23, 2006

(87) PCT Pub. No.: WO2005/031598

PCT Pub. Date: Apr. 7, 2005

(65) Prior Publication Data

US 2007/0113177 A1    May 17, 2007

(30) Foreign Application Priority Data

Sep. 30, 2003    (FR) .................................. 03 11434

(51) Int. Cl.
*G06F 17/00*    (2006.01)
(52) U.S. Cl. .................................................. 715/249
(58) Field of Classification Search .................. 715/249
See application file for complete search history.

(56) References Cited

U.S. PATENT DOCUMENTS 7,073,120 B2    7/2006    Torii et al. .................. 715/513
7,146,565 B2 *  12/2006   Toyama et al. .............. 715/239
7,210,095 B1 *  4/2007    Mor .......................... 715/234

(Continued)

FOREIGN PATENT DOCUMENTS

JP             9-223062             8/1997

(Continued)

OTHER PUBLICATIONS

Villard, "Authoring Transformations by Direct Manipulation for Adaptable Multimedia Presentations", Proceedings of the 2001 ACM Symposium on Document Engineering, published 2001, p. 125-134.*

(Continued)

*Primary Examiner*—Amelia Rutledge
(74) *Attorney, Agent, or Firm*—Fitzpatrick, Cella, Harper & Scinto

(57) ABSTRACT

Method of processing at least one digital graphical document represented in a predetermined markup language in which at least one software display program of browser type is used for displaying such a document, characterized in that the method comprises the following steps:

i) transforming the original document (ISVG1) displayed in read mode into an editable version in the markup language according to a set of predefined transformation rules not linked to the document, said transformation rules incorporating a set of rules for writing to the document;

ii) interacting via the software display program with the said editable version (ISVG2) in order to modify said editable version according to said set of writing rules; and iii) transforming the editable version thus modified into a version in read mode (ISVG3) incorporating the modifications made during step ii).

19 Claims, 6 Drawing Sheets

U.S. PATENT DOCUMENTS

| | | | |
|---|---|---|---|
| 7,228,498 B2 | 6/2007 | Torii et al. | 715/513 |
| 7,644,361 B2 * | 1/2010 | Wu et al. | 715/273 |
| 7,669,183 B2 * | 2/2010 | Bowman et al. | 717/113 |
| 2003/0084078 A1 | 5/2003 | Torii et al. | 707/513 |
| 2006/0168519 A1 | 7/2006 | Torii et al. | 715/523 |

FOREIGN PATENT DOCUMENTS

| | | |
|---|---|---|
| JP | 2002-342316 | 11/2002 |

OTHER PUBLICATIONS

Badros, et al., "A constraint extension to scalable vector graphics", Proceedings of the 10th International Conference on World Wide Web, published 2001, p. 489-498.*

Pramod Jain: "Draw and annotate in your browser using SVG", Internet, Online!, May 8, 2002, pp. 106, URL:http://builder.com.com/5100-6371=1-44978.html>.

Forbes, D., "Build Flexible, Lightweight XML-Based Images for ASP.NET Using Scalable Vector Graphics", MSDN Magazine, Online!, Jul. 2003, pp. 1-8, URL:http://msdn.microsoft.com/msdnmag/issues/03/07/ScalableVectorGraphics/default.aspx>.

Froumentin, M., Hardy, V., "Using XSLT and SVG together: a survey of case studies" SVG Open, Carto.net Developers Conference, Online! Jul. 17, 2002, pp. 1-10, Zurich, Switzerland, URL:http://www.svgopen.org/2002/papers/froumentin_hardy_xslt/index.html>.

Wenz, C., Hauser, T., "Scripting SVG" SVG Open, Carto.Net Developers Conference, Online!, Jul. 17, 2002, pp. 1-7, Zurich, Switzerland, URL:http://www.svgopen.org/2002/papers/hauser_wenz_scripting_svg/index.html>.

Edwards E., "Introduction to Jasc WebDraw", SVG Open, Carto.Net Developers Conference, Online!, Jul. 17, 2002, pp. 1-7, Zurich, Switzerland, URL:http://www.svgopen.org/2002/papers/edwards_jasc_webdraw/index.html>.

Anonymous, "Easily create charts and graphics in a browser," Internet, Online!, Jun. 11, 2002, p. 1-2, URL:http://builder.com.com/5100-6371-1044966.html>.

P. Jain, "Draw and annotate in your browser using SGV", Copyright © 2008 CNET Networks, Inc., (http://articles.techrepublic.com.com/5100-22-1044978.html).

Inoue, K., "Internet Script Course, 18$^{th}$, Mastering JavaScript (1)", Windows NT World, IDG Communications Inc., Jan. 1, 1998, vol. 1, No. 3, pp. 232-235.

* cited by examiner

METHOD AND DEVICE FOR EDITING SVG TYPE DIGITAL GRAPHICAL DOCUMENTS IN PARTICULAR FROM A BROWSER

The present invention concerns the editing of digital graphical documents of the SVG or similar type, in particular from a browser.

The SVG (Scalable Vector Graphic) language is a language for describing two-dimensional graphical documents written in a markup language of the XML (eXtensible Markup Language) or similar type.

The SVG language allows for three types of graphical object or document: vector graphic shapes (for example, paths consisting of straight lines and curves), images and text. The graphical objects can be grouped, transformed and composited into previously rendered objects. The SVG language comprises a set of functions such as nested transformations, clipping paths, masks and template objects.

SVG objects can be interactive and/or dynamic. Animations can thus be defined and triggered, either by incorporating SVG animation elements in SVG content, or via a script comprising for example executable commands.

Editors are already known which make it possible to modify Web content, such as Web pages written in a markup language of HTML ("HyperText Markup Language") type, directly from a simple Internet browser.

The Applicant was faced with the problem of modifying, in the same way as for text, digital graphical documents such as SVG graphical objects published on the Internet/World Wide Web by means of a simple Internet browser.

As the SVG language is a textual format owing to the fact that it belongs to the markup languages, it is possible to modify any SVG document from a simple text editor.

However, the Applicant wishes to be able to offer a more user-friendly and interactive environment, for example of WYSIWYG ("What you see is what you get") type, where interactions take place in particular by means of a man/machine interface device of the mouse or similar type.

The present invention provides precisely a solution to this problem.

It thus aims to provide an editor for SVG type digital graphical documents published on the Web, able to be executed on any browser whatsoever capable of displaying SVG documents in read mode.

It concerns a method of processing at least one digital graphical document represented in a predetermined markup language in which at least one software display program of browser type is used for displaying such a document.

According to a general definition of the invention, the method comprises the following steps:

i) transforming the original document displayed in read mode into an editable version in the markup language according to a set of predefined transformation rules, said transformation rules incorporating rules for writing to the document;

ii) interacting via the software display program with the said editable version in order to modify said editable version according to said set of writing rules; and iii) transforming the editable version thus modified into a version in read mode incorporating the modifications made during step ii).

In practice, the set of predefined transformation rules are not linked to the document.

The software display program of browser type is capable of using the set of transformation rules for transforming the original document into an editable version.

According to another embodiment, the reverse transformation according to step iii) is able, from an edited document, to retrieve the unedited document.

For example, the direct transformation according to step i) is able to add guidance information capable of guiding the reverse transformation according to step iii).

In practice, the guidance information belongs to the group formed by elements to be removed; elements situated in the modified document in a specific namespace; scripts updating the values of the guidance information; instruction information relating to the creation/modification of attributes.

According to yet another embodiment, the direct transformation according to step i) is able to identify each selectable graphical element.

According to yet another embodiment, the direct transformation according to step i) is able to incorporate/move nodes written in the SVG type markup language into a non-SVG namespace in order to deactivate the effects of the said nodes and the reverse transformation according to step iii) is able to retrieve the SVG nodes moved into a non-SVG namespace.

For example, the direct transformation according to step i) comprises a parameter capable of deciding to retain/remove an animation element.

According to another example, the direct transformation according to step i) comprises mutation events able to synchronously modify the document with respect to the initial document.

In practice, the direct transformation according to step i) incorporates a mechanism able to modify all or part of the edited document via programs available remotely from the document.

In practice, the reverse transformation according to step iii) is able to modify or remove an initialization script in order to save modifications made on graphical elements created by the initialization script.

Another object of the present invention is an apparatus for processing at least one digital graphical document represented in a predetermined markup language in which at least one software display program of browser type is used for displaying such a document.

According to another aspect of the invention, the apparatus comprises:

transformation means for transforming the original document displayed in read mode into an editable version in the markup language according to a set of specific transformation rules which incorporate rules for writing to the document;

processing means for interacting via the software display program with the editable version in order to modify it according to the said set of writing rules; and reverse transformation means for transforming the editable version thus modified into a version in read mode incorporating the modifications thus made by the processing means.

According to one embodiment, the set of predefined transformation rules are not linked to the document.

According to one embodiment, the reverse transformation means are able to retrieve, from an edited document, the unedited document.

According to another embodiment, the direct transformation means are able to add guidance information capable of guiding the reverse transformation means.

In practice, the guidance information belongs to the group formed by elements to be removed; elements situated in the modified document in a specific namespace; scripts updating the values of the guidance information; instruction information relating to the creation/modification of attributes.

According to yet another embodiment, the direct transformation means are able to identify each selectable graphical element.

In practice, the direct transformation means are able to incorporate/move nodes written in the SVG type markup language into a non-SVG namespace in order to deactivate the effects of the said nodes and the reverse transformation means are able to retrieve the SVG nodes moved into a non-SVG namespace.

Preferably, the direct transformation means are adapted to use a parameter capable of deciding to retain/remove an animation element.

According to yet another embodiment, the direct transformation means are adapted to process mutation events able to synchronously modify the document with respect to the initial document.

According to yet another embodiment, the direct transformation means incorporate in the writing rules a mechanism able to modify all or part of the edited document via programs available remotely from the document.

Another object of the present invention is a data medium readable by a computer system, possibly totally or partially removable, in particular a CD-ROM or a magnetic medium, such as a hard disk or a floppy disk, or a transmittable medium, such as an electrical or optical signal, the data medium comprising computer program instructions allowing implementation of the method referred to above, when this program is loaded and executed by a computer system.

Another object of the present invention is a computer program stored on a data medium, said program comprising instructions allowing implementation of a processing method as referred to above, when the program is loaded and executed by a computer system.

Other characteristics and advantages of the invention will emerge in the light of the following detailed description and the drawings in which.

Figure 1:
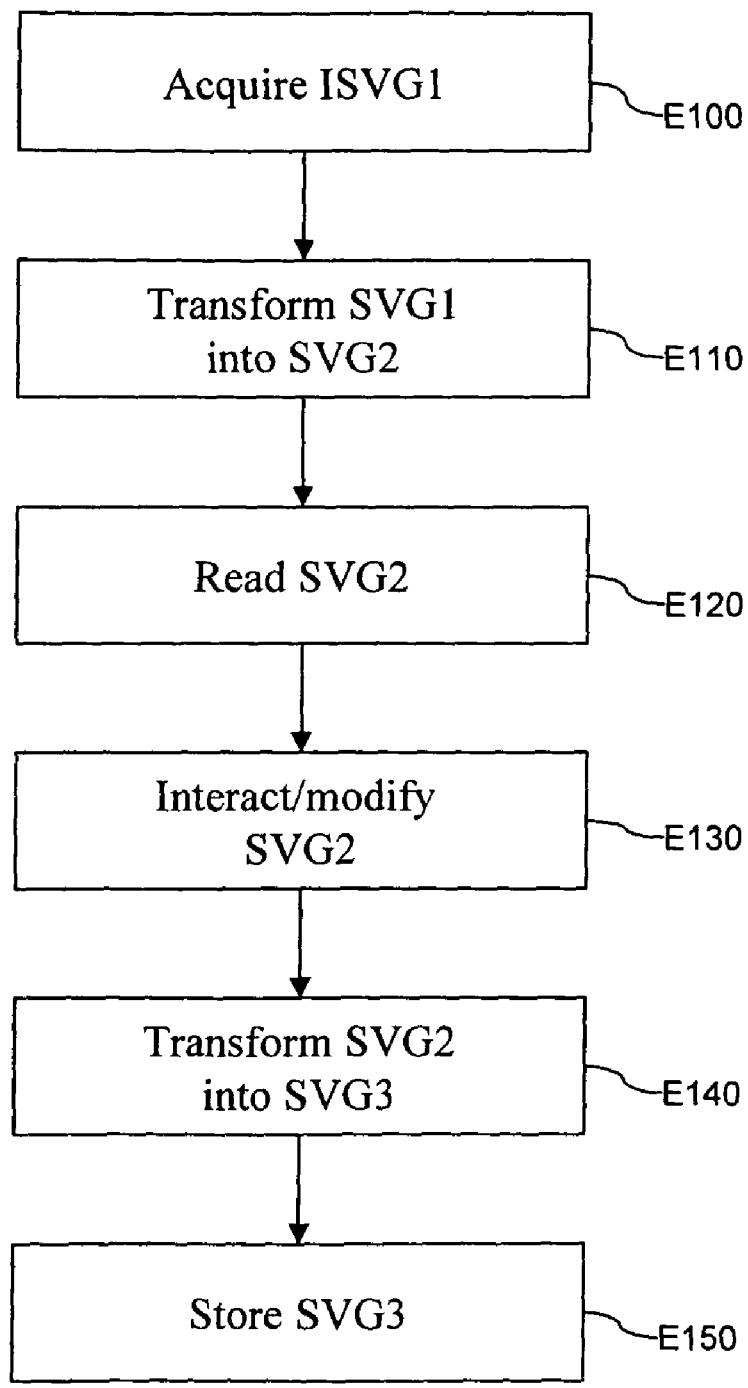
FIG. 1 is a flow diagram illustrating the main steps of the editing method according to the invention.

With reference to FIG. 1, the editing method according to the invention comprises at least five main steps.

Firstly, according to the step E100, provision is made to acquire an image ISVG1 on the Internet or World Wide Web.

Secondly, according to the step E110, provision is made to transform this first image ISVG1 into a second image ISVG2. This second image ISVG2 corresponds to an editable version of the first image ISVG1, according to a set of predefined writing rules not linked to the image ISVG1.

Thirdly, according to the step E120, provision is made to read the second image ISVG2.

Fourthly, according to the step E130, provision is made to interact or modify the second image ISVG2 according to the said set of writing rules.

Fifthly, according to the step E140, provision is made to perform the reverse transformation of the step E110 in order to obtain an updated version ISVG3 of the first image ISVG1.

If need be, according to the step E150, provision is made to store the updated version ISVG3 on the original server or some other storage means.

The transformations of steps E110 and E140 are preferably performed from a simple Internet browser.

Figure 2:
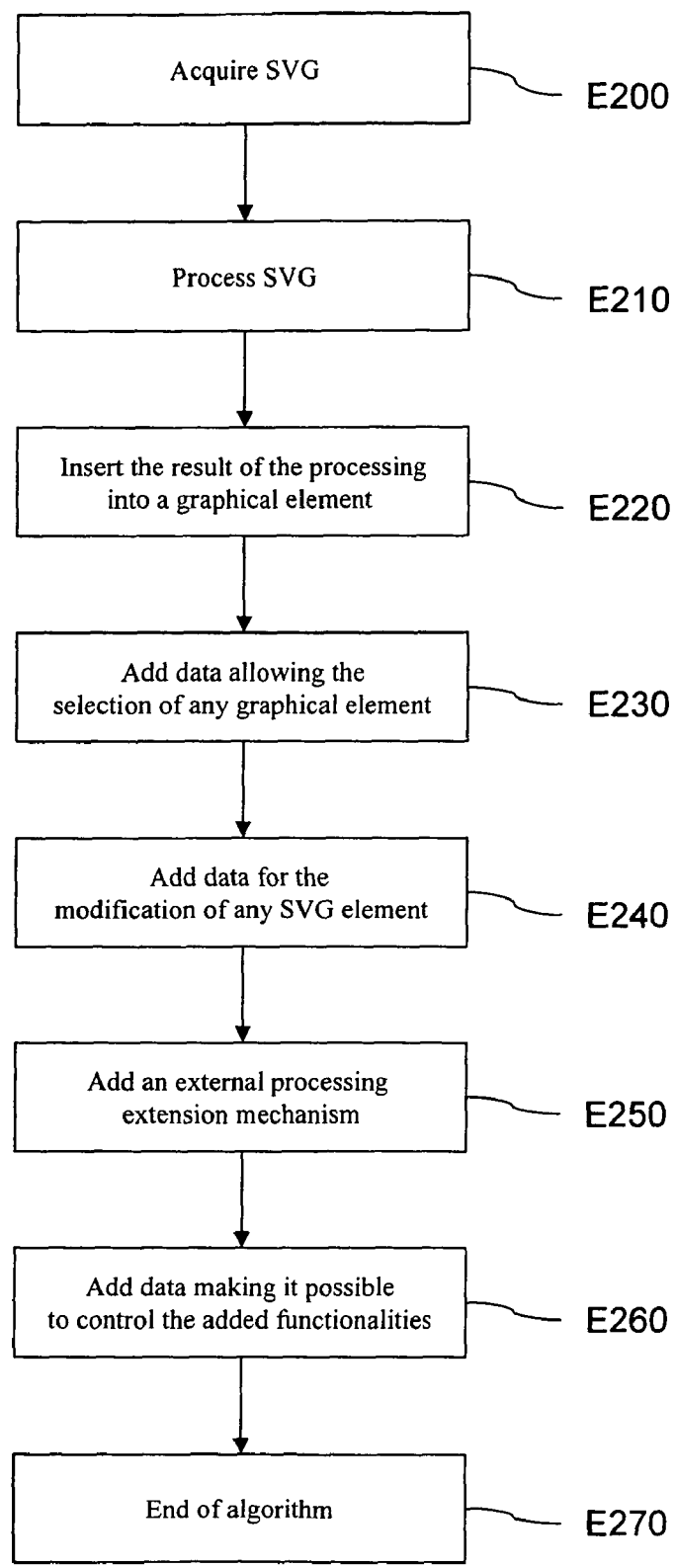
FIG. 2 is a flow diagram illustrating the transformation step according to the invention.

With reference to FIG. 2, the transformation E110 described with reference to FIG. 1 is performed in practice in two parts.

After acquisition of the document ISVG1 to be edited (step E200), a transformation (step E210) of this document into a new XML document is performed.

This new XML document contains all the information of the image in a new form and is inserted at the step E220 into a graphical element of an SVG document. This element retrieves the attributes of the <svg/> root element and an xml:base attribute is added to it in order to retain the relative URI references. This element is included in another graphical element, which makes it possible to put the edited SVG document at the desired scale.

This graphical element furthermore possesses interactive attributes that can for example be mouse events or mutation events.

In practice, mouse events allow element selection and interactive modification ("drag & drop").

"Mutation" events make it possible to track the modifications made to the SVG document, which is useful for performing synchronous updating if necessary, but also for updating the information making it possible to easily carry out the reverse transformation E140 that will be described in more detail below.

XML information is next added to this new document (steps E230 to E260) in order to construct a new SVG document. This last information is not specific to an image and corresponds to the various user interfaces allowing editing proper.

This information comprises in particular means making it possible to easily select any editable graphical element (step E230): this is for example a list of elements, or a script able to retrieve mouse events making it possible to know the element selected with the mouse.

According to the step E240, this information comprises means for modifying the edited SVG elements, possibly by adding new SVG elements. In practice, it is a question of adding graphical elements allowing the user to enter the parameters of each graphical element to be modified or created.

In accordance with the step E250, this information comprises means for applying external processing to all or part of the edited SVG document. In practice, it is a question of retrieving part of the SVG document and executing on this part a modification defined outside the editor, on a network or a hard disk for example. For example, it may be an XSLT transformation, a JavaScript script, or a Web service invocation.

In accordance with the step E260, this information comprises means for controlling the added functionalities. For example, these means make it possible to add certain information, in particular in order to zoom on part of the document, go into Active Script/Passive Script mode, or control the time scale.

A choice can be made to implement the steps E200 to E260 in the form of a single script. The implementation can also be separated into two parts the first corresponding to a transformation (XSLT, JavaScript, etc) of the SVG document to be edited, the second part being an SVG editing document directly comprising the data of the steps E230 to E260. The transformation of the document to be edited is then used in the SVG editing document.

Figure 3:
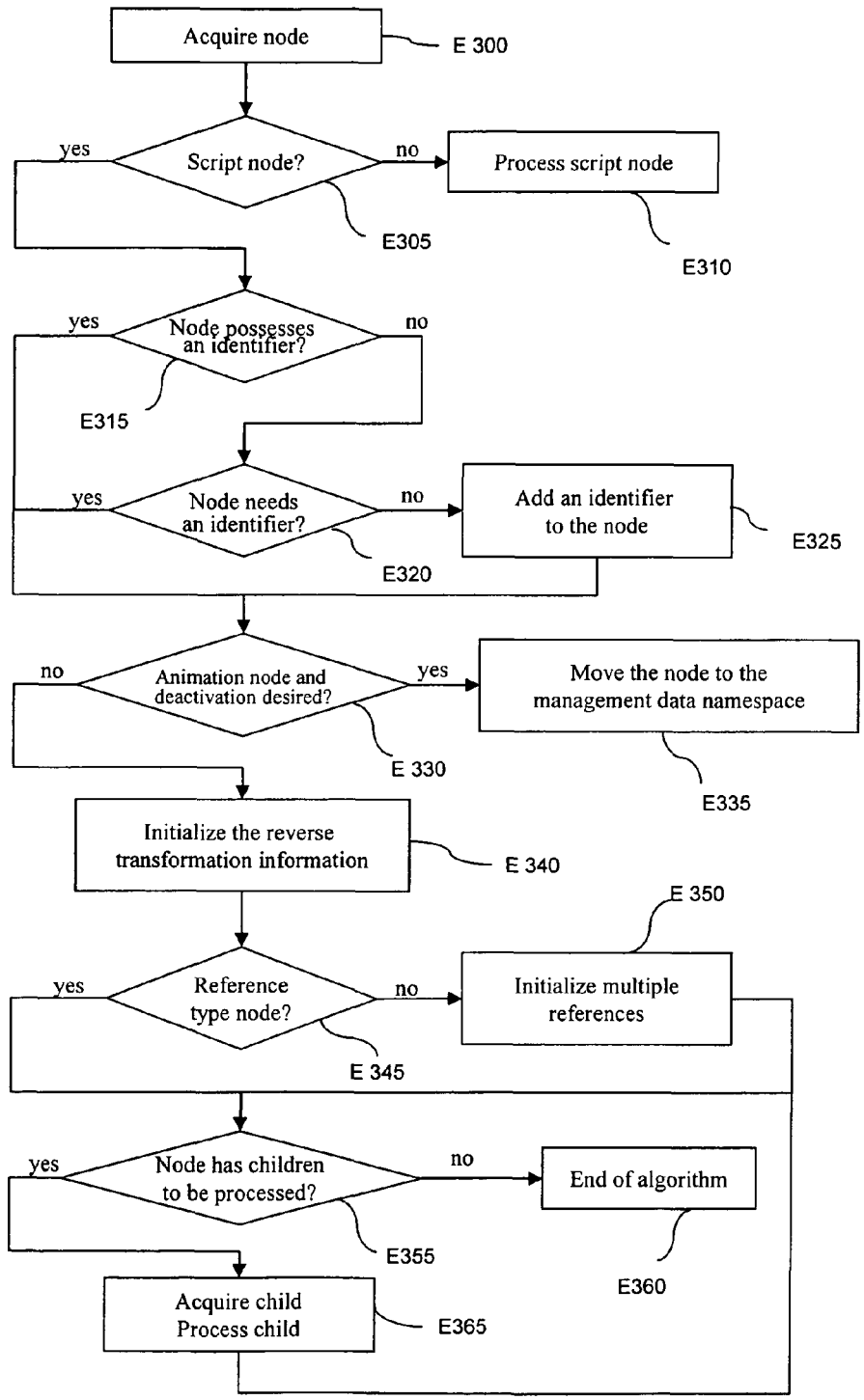
FIG. 3 is a flow diagram illustrating the SVG processing step according to the invention.

With reference to FIG. 3, the first transformation (E110, FIG. 1) is applied to each child of the first <svg/> tag. One or more XML trees are thus created, assembled into a single result used at the step E220 (FIG. 2).

The first step E300 consists of acquiring the node to be processed.

A test is made at the step E305 as to whether this is a node defined by reference or directly.

If a relative reference external to the document is concerned, it is transformed into an absolute reference (which makes it possible to store the edited document under any URI whatsoever).

If a script type node is concerned (step E305), the script node is transformed (step E310) by means of the algorithm described with reference to FIG. 4. Otherwise, a test is made at the step E315 as to whether the node has an identifier. An identifier is added to it (step E325) if (step E320) the element is a graphical element without an identifier, which can be displayed and selected with the mouse. This allows an easier implementation of the graphical element selection.

Next the management data namespace is used. As SVG has an open content model, all information that is not in the SVG namespace is not taken into account by an SVG reader. This possibility can therefore be used for adding information that is not useful during the user interaction phase but is useful during the reverse transformation.

The step E330 thus tests whether the current node is an animation node and whether or not the animations are to be deactivated.

If this is the case, the node is moved (step E335) into the management data namespace, which allows deactivation of the animation during the interaction phase, reintegration of these animations during the transformation phase, and no information loss.

Next, at the step E340, the information necessary for the reverse transformation is initialized. This information (which is put in the form attributes) makes it possible to know the following during the reverse transformation: whether or not the elements have been modified, whether or not the elements are to be removed, or whether the graphical elements are defined in XML or created/modified via a script using DOM (programmatic graphical representation of an XML document or "Document Object Model").

In the case of creation/modification by script, this information also makes it possible to know whether an initialization script is concerned at the time of loading the SVG.

Elements can be created by a script (at the time of display of the document for example), in which case it is necessary to remove them at the time of the reverse transformation. Furthermore, elements added by a script called in the original SVG document are not necessarily modifiable. This management information therefore makes it possible to differentiate the editing of these elements.

Other information is also stored in the management namespace: for example the URI of the original document to the SVG document in order to allow the step of storing the modified file and facilitate the reverse transformation.

During the step E345, a test is next made as to whether the node to be processed corresponds to a reference node (<symbol/> type). In this case, an attribute containing a list of the elements that reference this node is added to it. If the user then wishes to modify an element referencing this node, he is asked whether he wishes to modify the node (and therefore all the referent elements) or only the graphical element, in which case the node is cloned, it is modified and the graphical element is pointed to the modified node. Finally, if the node has children to be processed (step E355), each of the nodes is recursively processed in the same way (step E360), otherwise the algorithm ends (step E365) by returning the result of the processing.

To finish the processing of the SVG document, the attributes of the <SVG/> root element are copied into the management namespace in order to allow the reverse transformation to retrieve them. Furthermore, the attributes of the root element are repeated in part in the graphical elements incorporating the result of the transformation, in particular the "event" attributes.

Figure 4:
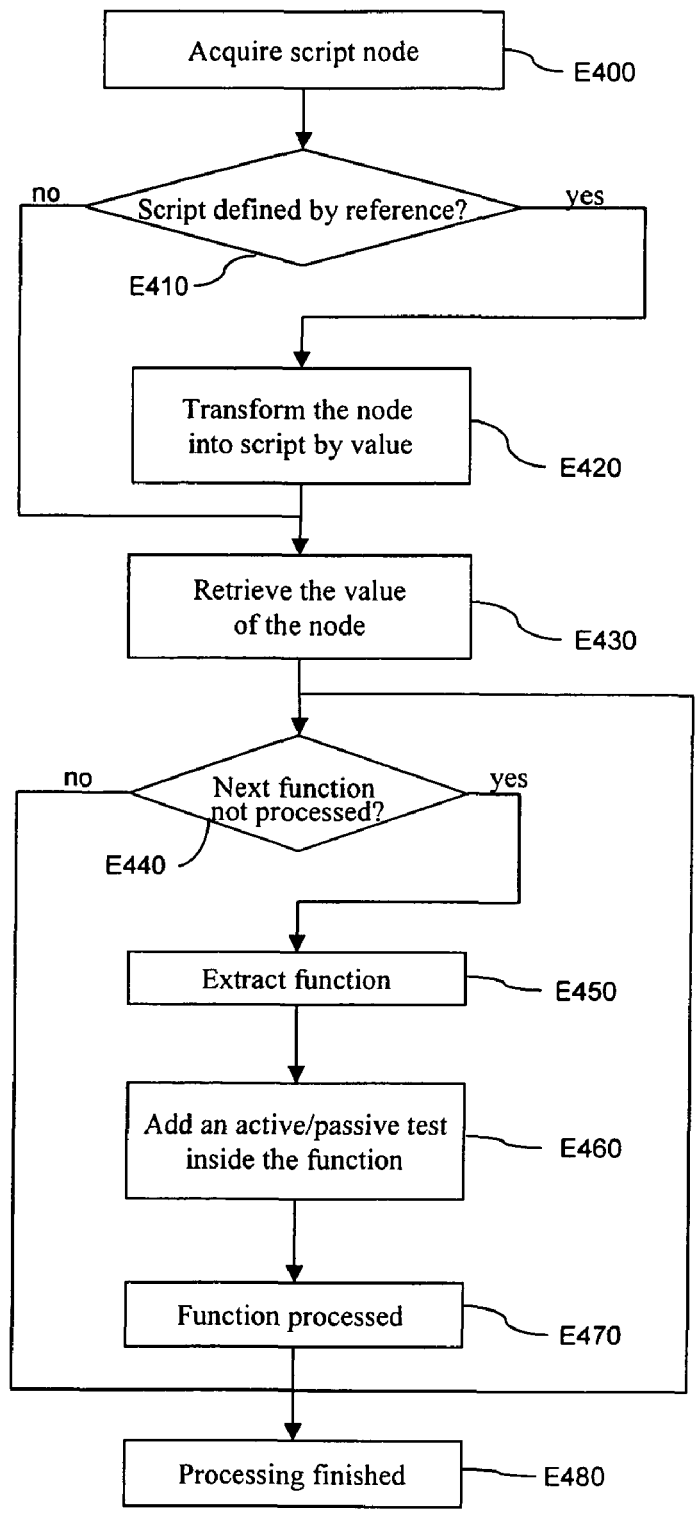
FIG. 4 is a flow diagram illustrating the script node transformation step according to the invention.

With reference to FIG. 4, the processing of script nodes has been depicted.

The effects of scripts can be a nuisance during the SVG editing phase; the user is therefore allowed to deactivate and activate them.

To do this, after acquisition of a script node (step E400 which follows step E310), the value of the node is retrieved (step E430) and, for each function of the node (steps E440, E450 and E470), a test is added (step E460) making it possible to know whether or not the function has to be executed.

This test corresponds simply to checking whether an attribute "scriptEnable" for active script is set to true or false. The user can modify this attribute during the editing phase in order to activate/deactivate these scripts.

Generally, the functions called by the method of the invention are defined directly in the document. If these functions are defined in another document, it is possible to define the script node by reference to the external document. In the case where a script node is defined by reference (step E410), the document pointed to is retrieved and it is inserted as the value of this node (step E420). Furthermore, the reference to the external document is removed.

The majority of interactions consist of modifying elements that are written directly in the SVG document. In this case, it is sufficient to modify the element using the DOM functionalities. The management data, in particular the attributes corresponding to the node modification/non-modification test, are updated. The addition of new elements is also offered to the user. All the DOM functionalities for modifying the tree (change of place/node cloning for example) are possible, provided they comply with the SVG standard.

It is possible for the SVG document to contain scripts that will modify this document at precise times. When such scripts add elements, these elements are removed during the reverse transformation. On the other hand, modifications made on pre-existing elements are more difficult to manage. This is because it is possible for the user to delete these modifications by interactions Furthermore, during rereading of the saved SVG document, these scripts can again modify the document. In order to overcome this problem, the method according to the invention offers the user editing/modification of the scripts.

In many SVG documents, an initialization script is used to add new graphical elements and/or modify elements present. It is important to not interfere with this initialization. For this reason, the scripts are not deactivated at the start of the editing. The modifications made are detected by means of "mutation" events (element creation by script can be detected differently) and taken into account in different ways.

For example, if new elements are concerned, they are marked as such (elements created by script) and they are placed, if this is not already the case, in the graphical element that contains all the edited graphical elements.

In another example, if attribute modification/addition is concerned, it is indicated (via the management data namespace) that these attributes are modified by an initialization script.

Certain modifications of graphical elements created/modified by initialization script are permitted. If the user wishes to modify such elements, he is warned that these modifications will not necessarily be retained after the save phase. When it is a question of simple modifications (change of values of attributes or elements), the modifications are noted in the form of a script and there is added to the modified element an attribute (in the management data namespace) that points to this new script. The reverse transformation will then add this script to the script called at the end of the initialization script.

During the reverse transformation, the XML elements created by the initialization script are to be removed. They are therefore labeled as to be removed.

The SVG language supports certain functionalities of the language called SMIL (Synchronized Multimedia Integration Language) and which is a multimedia document animation format. These animations come in the form of <animate/>, <animateMotion/>, <animateColor/> and <set/> elements inside graphical elements. To facilitate the document editing, the direct transformation possesses a parameter that makes it possible to define whether it is wished to retain or deactivate these elements, for example by incorporating them in an element whose namespace is not that of SVG but the one defined for the management information. Thus, the reverse transformation can reintegrate these elements.

The user enters a URI that corresponds to a document allowing an operation to be carried out on all or part of the SVG document. This URI points to a document of the script (XSLT, JavaScript) or WSDL (Web Services Description Language) type, which define processing that can be performed on an SVG data fragment. The user then chooses the part of the edited SVG document to be modified. The program then initiates a script that will execute the script/Web service. The script retrieves the result and adds it to the SVG document, possibly in the place of the part of the SVG document input.

The direct transformation (step E110, FIG. 1) initializes the information useful for the reverse transformation (step E140, FIG. 1). The scripts added to the edited SVG document make it possible to keep this information up to date in accordance with the user interactions. The reverse transformation takes the SVG document modified by the operations of the user and transforms it in order to put it back in a format close to the original edited SVG document. To do this, the reverse transformation will use this addition information for constructing the result document.

Figure 5:
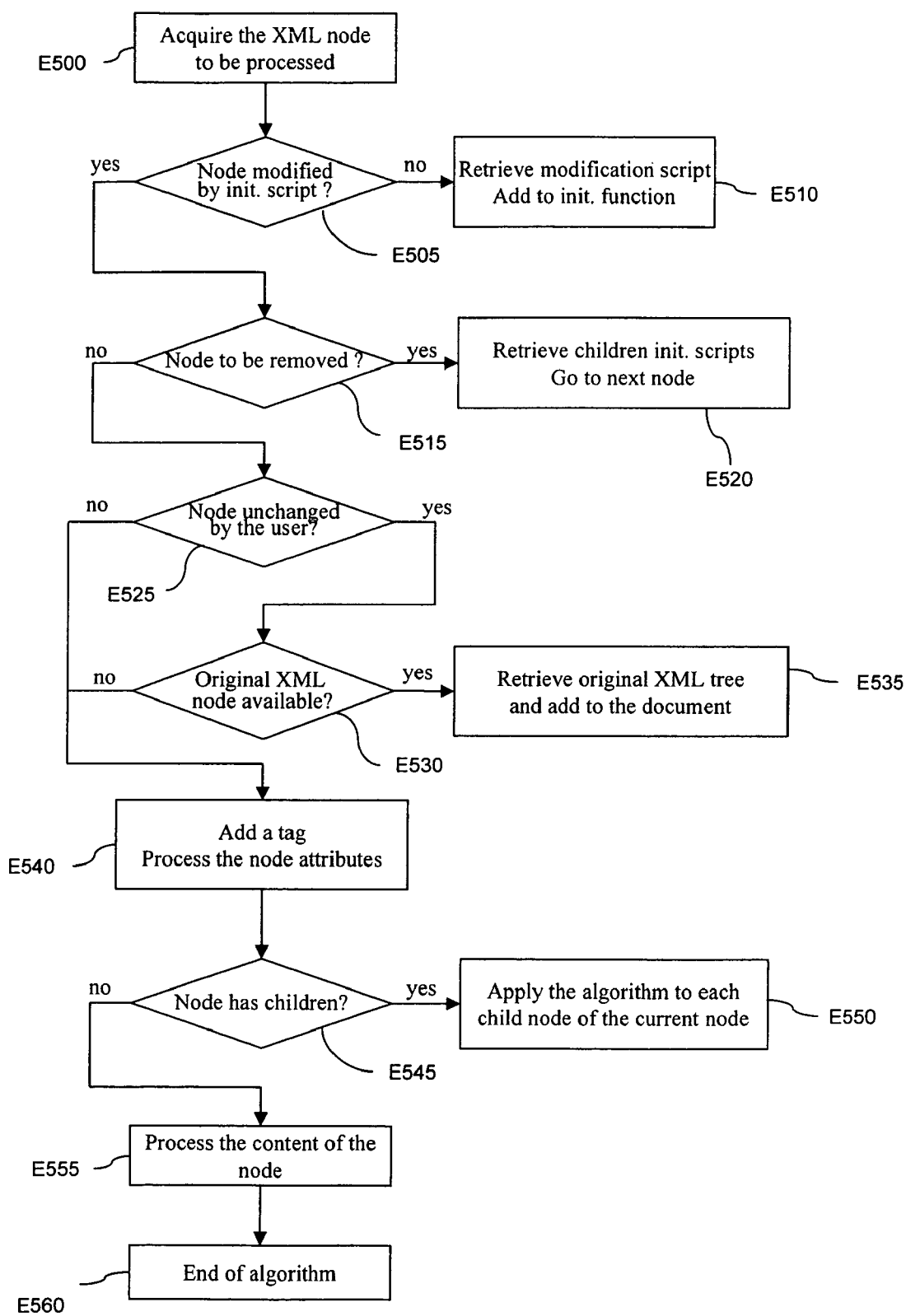
FIG. 5 is a flow diagram illustrating the reverse transformation step according to the invention.

With reference to FIG. 5, at the step E500, the reverse transformation retrieves the XML node to be processed. At the step E505, a test is made as to whether the node has been modified or created by an initialization script. If yes, the modification script is retrieved if one exists (step E510), otherwise step E515 is gone to directly. Step E515 consists of testing whether the node is to be removed. If this is the case, step E520 is gone to. All the post-initialization modification scripts corresponding to the child nodes are then retrieved, and are added to the end of the initialization script. The next node is then gone to directly. The process can be refined by separating the nodes where only the tag is to be removed, the children having to be processed normally. In this case, all the children are retrieved and put in the list of nodes to be processed.

If the node is not to be removed, the step E525 is gone to.

At the step E525, a test is made for any modification of the node by the user. In the absence of modification, the original XML node is retrieved (steps E530 and E535) and added to the document. The processing is then finished for this node and the next node is gone to.

If the node has been modified or if the original XML node is not possessed, step E540 is gone to. An element corresponding to the node is added, the attributes are filtered in order to remove the attributes of the management data namespace and the identification attributes if they were created by direct transformation. If the node has children (step E545), each of the children is processed recursively (step E550), otherwise the value of the node is processed (step E565). This step consists of copying the value except in the case of script nodes in which case the test corresponding to the activation/deactivation of scripts is removed. The algorithm is then finished (step E560).

Once the document has been transformed, the last step consists of integrating this document into an <SVG/> element to which the information stored in the direct transformation is added.

For example, the document ISVG1 to be processed, in read version, corresponds to the following SVG document.

```
<svg width="250" height="250"
    xmlns="http://www.w3.org/2000/svg"
    xmlns:xlink="http://www.w3.org/1999/xlink"
    xmlns:nsvg="http://example.com/nonsvgns">
    <g      id="Group"      style="stroke-width:4;stroke
antialiasing:false" >
        <image   xlink:href="image.jpg" x="10" y="10" width="40"
height="40" />
        <text    style="font-size:12;fill-opacity:1"   x="50"
y="10">
           My SVG image
        </text>
    </g>
    <script type="text/ecmascript" xlink:href="myscript.js"/>
</svg>
```

In write mode, the document ISVG2 correspond to the following instructions.

```
<svg width="1600" height="1600" viewBox="0 0 1600 1600"
    xmlns="http://www.w3.org/2000/svg"
    xmlns:xlink="http://www.w3.org/1999/xlink"
    xmlns:nsvg="http://example.com/nonsvgns">
    <g id=" nsvg:svg_image">
        <!--the next element encapsulates the source image -->
        <g              id="nsvg:wrapper
url="http://example.com/servlet/Update?id=10"
            switch="true"     onmouseup="on_mouseupp(evt)
onload="init(evt)">
            <g     id="Group"       style="stroke-width:4;stroke
antialiasing:false" >
                <image    xlink:href="image.jpg"   x="10"  y="10"
width="40" height="40" />
                <text    style="font-size:12;fill-opacity:1"   x="50"
y="10">
                   My SVG image
                </text>
            </g>
        </g>
        <g nsvg:remove="true">
            <!-- contains the UI objects for interaction and
display
                contains in particular GUIs for SVG object
selection
                contains in particular GUIs for SVG object
modification -->
```

-continued

```
            <text x="90" y="10" style="text-anchor:left;font
Size:12">X=</text>
        <!-- other svg elements -->
        </g>
      </g>
      <script type="text/ecmascript" nsvg:remove="true">
        <!--nsvg:remove is information that will guide the
reverse transformation-->
        <![CDATA[
          function on_mouseup(evt)
          {
            // allows interaction with the user such a
drag&drop,
            // object redimensioning, etc.
          }
          <!-- other javascript functions -->
        ]]>
      </script>
      <script type="text/ecmascript" nsvg:href="myscript.js"
nsvg:remove="initThere">
        <!-- inlined scripts functions with a disable
mechanism-->
      </script>
    </svg>
```

For this example, the transformation rules are defined in the form of an XSLT script. This script will in particular include elements allowing interaction with the user (graphical object move function using drag & drop)

```
<xsl:stylesheet version="1.0"
    xmlns:xsl="http://www.w3.org/1999/XSL/Transform"
    xmlns:xlink="http://www.w3.org/1999/xlink"
    xmlns="http://www.w3.org/2000/svg">
  <xsl:template match="*">
    <svg>
      <xsl:copy-of select="@*"/>
      <xsl:attribute name="width">1600</xsl:attribute>
      <xsl:attribute name="height">1600</xsl:attribute>
      <xsl:attribute name="viewBox">0 0 1600 1600</xsl:attribute:
        <xsl:if test="not(@id)">
          <xsl:attribute name="id">root</xsl:attribute>
        </xsl:if>
        <g    id="    nsvg:wrapper"    switch="true
onmouseup="on_mouseupp(evt)"onload="init(evt)">
          <xsl:attribute name="url">...</xsl:attribute>
          <xsl:for-each select="*[not(name()='script')]">
            <xsl:call-template name="transformNode"/>
          </xsl:for-each>
            <g nsvg:remove="true">
              <text x="90" y="10" style="text-anchor:left;font
size:12">X=</text>
        <!-- other svg elements -->
        </g>
      </g>
      <script type="text/ecmascript" nsvg:remove="true">
        <!--nsvg:remove is information that will guide the
reverse transformation -->
        <![CDATA[
          function on_mouseup(evt)
          {
            // allows interaction with the user such a
drag&drop,
            // object redimensioning, etc.
          }
          <!-- other javascript functions -->
        ]]>
      </script>
      <!--other svg elements-->
    </svg>
  </xsl:template>
  <xsl:template name="transformNode">
    <-- transformation rules for each svg child -->
    <xsl:template>
</xsl:stylesheet>
```

Furthermore the writing rules are here for example of the deletion, insertion, modification or similar type.

Figure 6:
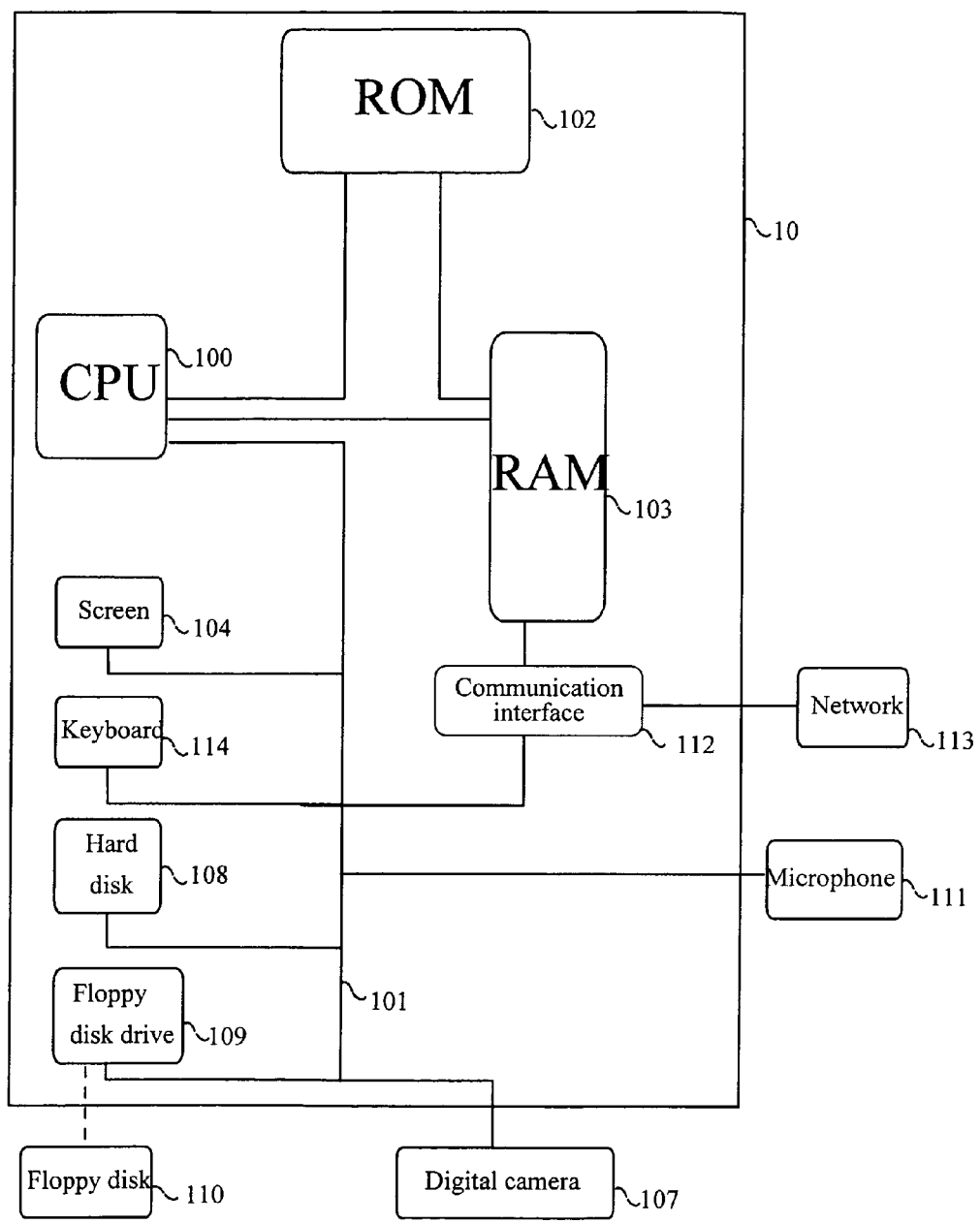
FIG. 6 depicts schematically a device allowing implementation of the method according to the invention.

With reference to FIG. 6, a device is depicted for implementing the software that makes it possible to process SVG documents in accordance with the method of the invention.

The device can be for example a microcomputer 10 connected to various peripherals, for example a digital camera 107 (or a scanner, or any image acquisition or storage means) connected to a graphics card and supplying information to be processed according to the invention.

The device 10 comprises a communication interface 112 connected to a network 113 able to transmit digital information. The device 10 also comprises a storage means 108 such as for example a hard disk. It also comprises a floppy disk drive 109. The floppy disk 110 like the disk 108 can contain software organization data of the invention as well as the code of the invention that, once read by the device 10, will be stored on the hard disk 108. According to a variant, the program that allows the device to implement the invention can be stored in read-only memory 102 (called ROM in the drawing). The same applies for the coding procedures. In a second variant, the program can be received in order to be stored in a manner identical to that described previously by means of the communication network 113.

The device 10 is connected to a microphone 111 by means of the I/O card 106. The data to be processed according to the invention will be audio signal in this case.

This same device possesses a screen 104 making it possible to display the information to be processed or to serve as an interface with the user who can parameterize certain processing modes, by means of the keyboard 114 or any other means (a mouse for example).

The central unit 100 (called CPU) executes the instructions relating to the implementation of the invention, instructions stored in the read-only memory 102 or in the other storage elements. During power-up, the programs and processing procedures stored in one of the non-volatile memories, for example the ROM 102, are transferred into the random access memory RAM 103 which will then contain the executable code of the invention as well as the variables necessary for implementing the invention. In a variant, the processing procedures can be stored in different locations. This is because it is possible to improve the invention by adding new procedures transmitted either by the communication network 113 or by means of floppy disk 110. Of course, the floppy disks can be replaced by any data medium such as CD-ROM or memory card.

The communication bus 101 allows communication between the different sub-elements of the microcomputer 10 or those connected thereto. The representation of the bus 101 is not limiting and in particular the central unit 100 is capable of communicating instructions to any sub-element of 10 directly or by means of another sub-element of the microcomputer 10.

The device described here is capable of containing all or part of the processing described in the invention.

The invention claimed is:

1. A method of processing at least one digital graphical non-editable original document represented in a predetermined markup language in which at least one software display program of a browser type is used for displaying such a document, the method comprising the following steps:

i) transforming the non-editable original document displayed in read mode into an editable version in the markup language according to a set of predefined transformation rules, the transformation rules incorporating a set of rules for writing to the document to add into the editable version guidance information capable of guiding a reverse transformation;

ii) interacting via the software display program with the editable version in order to modify the editable version according to the set of writing rules; and iii) reverse transforming, by using said guidance information, the editable version thus modified into a non-editable version in read mode incorporating the modifications made during step ii), wherein the direct transformation according to step i) is able to incorporate/move nodes written in the SVG type markup language into a non-SVG namespace in order to deactivate the effects of the said nodes, and the reverse transformation according to step iii) is able to retrieve the SVG nodes moved into a non-SVG namespace.

2. A method according to claim 1, wherein the set of predefined transformation rules are not linked to the document.

3. A method according to claim 2, wherein the software display program of browser type is capable of using the set of transformation rules for transforming the original document into an editable version.

4. A method according to claim 1, wherein the guidance information belongs to the group formed by elements to be removed; elements situated in the modified document in a specific namespace; scripts updating the values of the guidance information; instruction information relating to the creation/modification of attributes.

5. A method according to claim 1, wherein the direct transformation according to step i) is able to identify each selectable graphical element.

6. A method according to claim 1, wherein the direct transformation according to step i) comprises a parameter capable of deciding to retain/remove an animation element.

7. A method according to claim 1, wherein the direct transformation according to step i) incorporates mutation events able to synchronously modify the document with respect to the initial document.

8. A method according to claim 1, wherein the direct transformation according to step i) incorporates a mechanism able to modify all or part of the edited document via programs available remotely from the document.

9. A method according to claim 1, wherein reverse transformation according to step iii) is able to modify an initialization script in order to save modifications made on graphical elements created by the initialization script.

10. An apparatus for processing at least one digital graphical non-editable original document represented in a predetermined markup language in which at least one software display program of a browser type is used for displaying such a document, comprising:

transformation means for transforming the non-editable original document displayed in read mode into an editable version in the markup language according to a set of predefined transformation rules, the transformation rules incorporating a set of rules for writing to the document to add into the editable version guidance information capable of guiding a reverse transformation;

processing means for interacting via the software display program with the editable version in order to modify the editable version according to the set of writing rules; and reverse transformation means for transforming, by using said guidance information, the editable version thus modified into a non-editable version in read mode incorporating the modifications thus made by said processing means, wherein said transformation means are able to incorporate/move nodes written in the SVG type markup language into a non-SVG namespace in order to deactivate the effects of said nodes, and the said revere transformation means are able to retrieve the SVG nodes moved into a non-SVG namespace.

11. An apparatus according to claim 10, wherein the set of predefined transformation rules are not linked to the document.

12. An apparatus according to claim 10, wherein said reverse transformation means are able to retrieve, from an edited document, the unedited document.

13. An apparatus according to claim 10, wherein the guidance information belongs to the group formed by elements to be removed; elements situated in the modified document in a specific namespace; scripts updating the values of the guidance information; instruction information relating to the creation/modification of attributes.

14. An apparatus according to claim 10, wherein the said direct transformation means are able to identify each selectable graphical element.

15. An apparatus according to claim 10, wherein said transformation means are adapted to use a parameter capable of deciding to retain/remove an animation element.

16. An apparatus according to claim 10, wherein said transformation means are adapted to process mutation events able to synchronously modify the document with respect to the initial document.

17. An apparatus according to claim 10, wherein said transformation means comprise a mechanism able to modify all or part of the edited document via programs available remotely from the document.

18. An apparatus according to claim 10, wherein said transformation means are able to modify an initialization script in order to save modifications made on graphical elements created by the initialization script.

19. A computer-readable storage medium storing a computer program that when executed causes a computer to perform a method of processing at least one digital graphical non-editable original document represented in a predetermined markup language, in which at least one software display program of browser type is used for displaying such a document, wherein the method comprises the following steps:

i) transforming the non-editable original document displayed in read mode into an editable version in the markup language according to a set of predefined transformation rules, the transformation rules incorporating a set of rules for writing to the document to add into the editable version guidance information capable of guiding a reverse transformation;

ii) interacting via the software display program with the editable version in order to modify the editable version according to the set of writing rules; and iii) reverse transforming, by using said guidance information, the editable version thus modified into a non-editable version in read mode incorporating the modifications made during step ii), wherein the direct transformation is able to incorporate/move nodes written in the SVG type markup language into a non-SVG namespace in order to deactivate the effects of the said nodes, and the reverse transformation is able to retrieve the SVG nodes moved into a non-SVG namespace.

* * * * *